United States Patent [19]
Cox et al.

[11] Patent Number: 6,023,273
[45] Date of Patent: Feb. 8, 2000

[54] USER INTERFACE WITH REPEATING INTERACTIVE BACKGROUND ELEMENTS

[75] Inventors: Patrick H. Cox, Raleigh; Mark Edward Molander, Cary; David J. Schell, Raleigh, all of N.C.

[73] Assignee: International Business Machines Corporation, Armonk, N.Y.

[21] Appl. No.: 09/050,314

[22] Filed: Mar. 30, 1998

[51] Int. Cl.[7] .................................................... G06F 3/14
[52] U.S. Cl. ........................ 345/339; 345/430; 345/348; 345/334; 345/352; 345/335
[58] Field of Search ................... 345/430, 339, 345/348, 354, 334, 145, 340, 335, 352

[56] References Cited

U.S. PATENT DOCUMENTS

| | | | |
|---|---|---|---|
| 5,617,548 | 4/1997 | West et al. | 345/320 |
| 5,652,850 | 7/1997 | Hollander | 345/333 |
| 5,737,553 | 4/1998 | Bartok | 345/339 |
| 5,796,967 | 8/1998 | Filepp et al. | 345/339 |
| 5,825,357 | 10/1998 | Malamud et al. | 345/340 |
| 5,867,161 | 2/1999 | Walsh | 345/347 |

*Primary Examiner*—Raymond J. Bayerl
*Assistant Examiner*—Chong T. Thai
*Attorney, Agent, or Firm*—Myers Bigel Sibley & Sajovec, P.A.; Jeanine S. Ray-Yarletts

[57] ABSTRACT

A user interface for a data processing system includes a desktop workspace with a background containing one or more sets of interactive graphical elements arranged in respective repeating patterns. Each of the graphical elements of the one or more sets is responsive to user input for performing various functions associated with one or more application programs. The graphical elements of the one or more sets may change appearances in response to changes in status of one or more of the application programs.

53 Claims, 12 Drawing Sheets

USER INTERFACE WITH REPEATING INTERACTIVE BACKGROUND ELEMENTS

FIELD OF THE INVENTION

The present invention relates generally to data processing systems and, more particularly, to graphical user interfaces for data processing systems.

BACKGROUND OF THE INVENTION

Graphical user interfaces are designed to make human interaction with computers more intuitive. Exemplary graphical user interfaces are provided with operating systems such as IBM OS/2® and Microsoft Windows 95®. These operating systems rely on a "window-like" workspace for displaying application programs, operating system information such as directory information, and program groupings. Multiple windows may be displayed on the screen of a computer display simultaneously on what is often referred to as a "desktop."

Figure 1A:
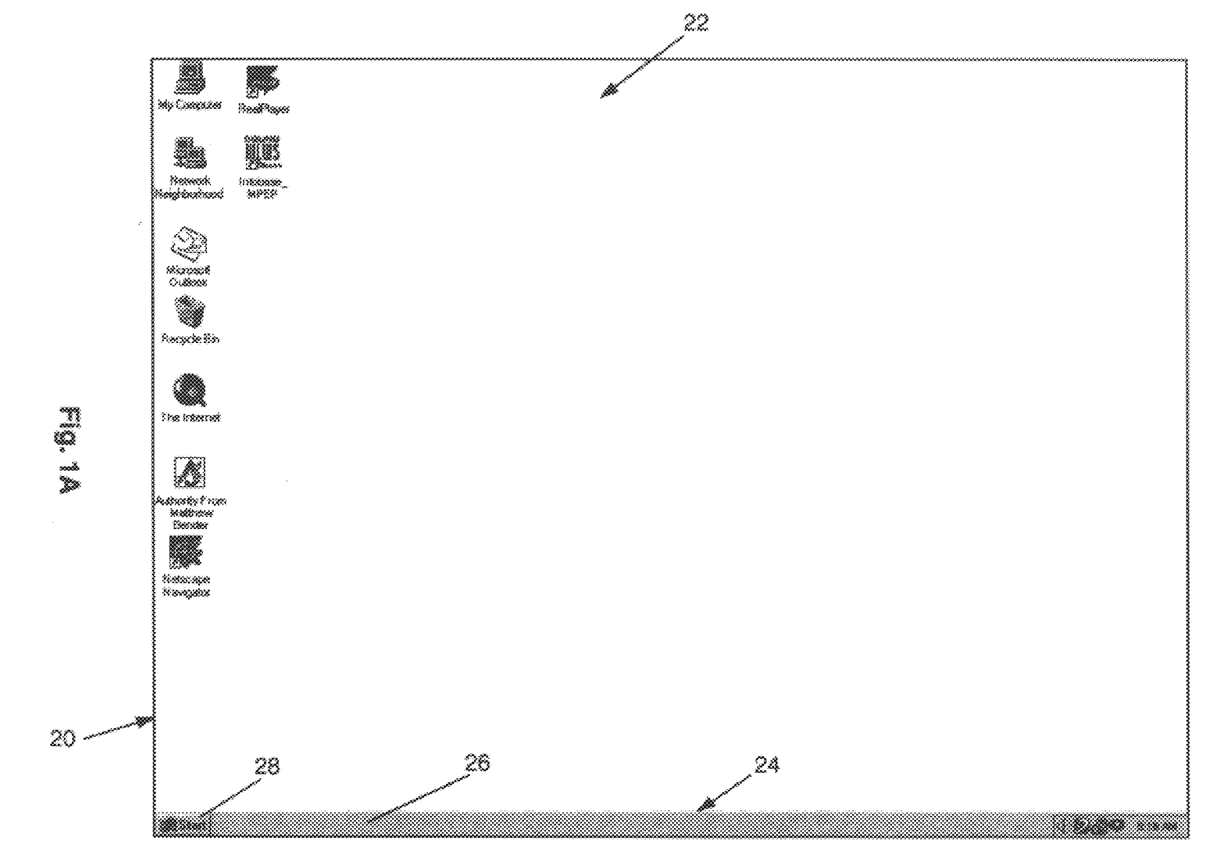
FIG. 1A illustrates a graphical user interface for the operating system Windows 95® having a desktop workspace.

An exemplary desktop 20 for the operating system Windows 95® is illustrated in FIG. 1A. The illustrated desktop 20 includes a workspace 22 within which windows associated with application programs may be displayed. Along a lower edge portion 24 of the desktop 20 is an access bar 26 for the Windows 95® desktop, also referred to as the "taskbar." The taskbar 26 contains a "Start" button 28 which may be used to open application programs within windows displayed within the workspace 22, as is known to those skilled in the art.

Figure 1B:
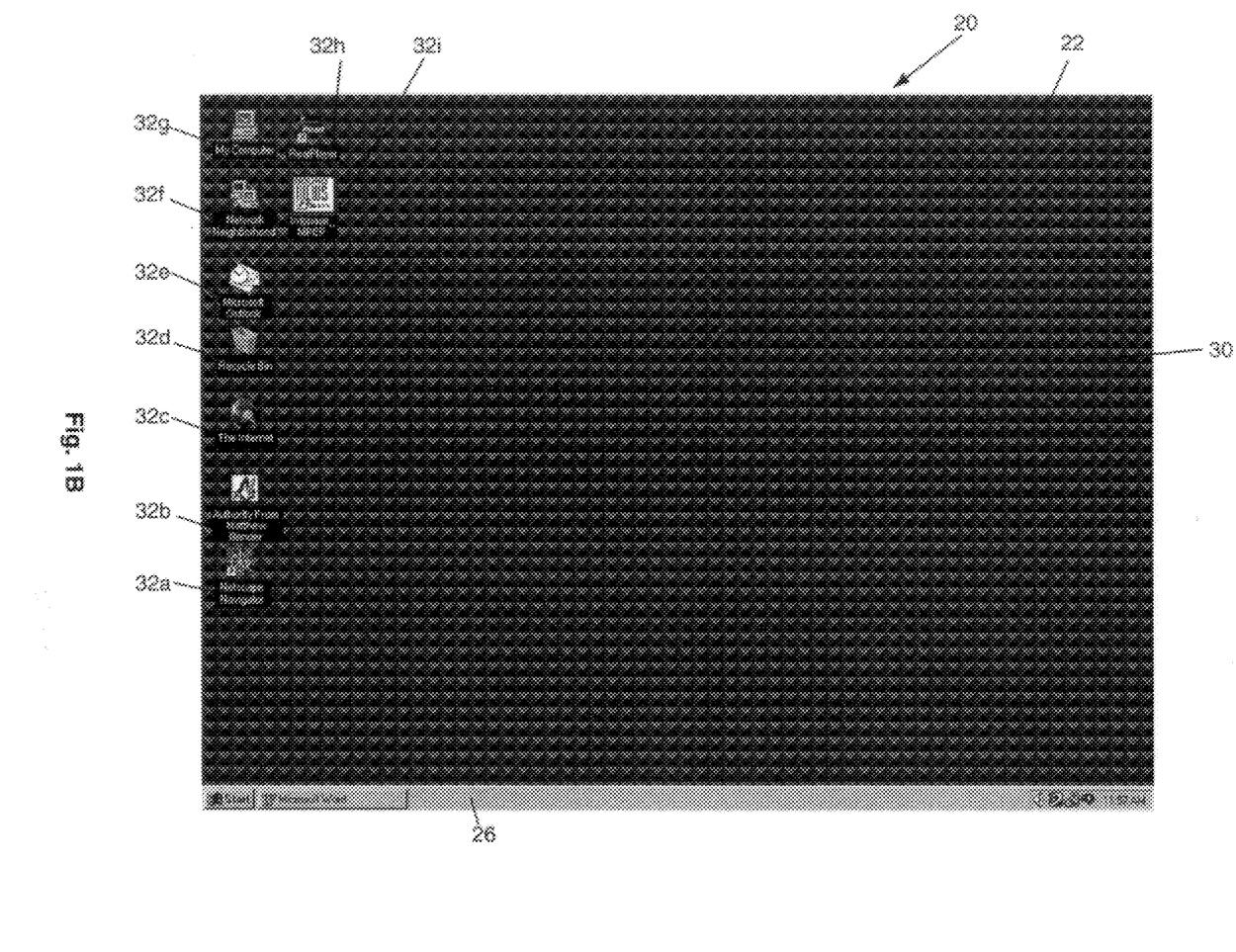
FIG. 1B illustrates the desktop workspace of the graphical user interface of FIG. 1A having a background.

Referring now to FIG. 1B, the desktop workspace 22 of FIG. 1A has a static background 30, also referred to as "wallpaper." The background 30 covers the entire desktop workspace 22 and serves as the underlying layer upon which windows, icons, and other objects are placed within the workspace. The background is provided for aesthetic purposes only, and serves no other function. As illustrated, multiple application program icons 32a–32i overlie the background along a left-most portion of the desktop workspace. As is understood by those skilled in the art, various static background designs may be implemented by a user. The operating system Windows 95®, for example, provides users with multiple background design selections, including a "blank" background as illustrated in FIG. 1A.

Software applications may implement application desktop "toolbars" or "appbars" which may provide quick access to an application's functions and/or status. For example, current applications that include appbars, include, but are not limited to: Netscape® Communicator; IBM eNetwork Web Express®, Lotus SmartSuite®, and Microsoft Office 97®. A desktop appbar may have a constant presence within an operating system desktop, whether or not the application program associated with the appbar is open or closed. Appbars may be implemented as a bar docked to the top, bottom, or sides of a desktop. Appbars may also be free-floating such that they can be placed anywhere within a desktop.

Unfortunately, appbars occupy valuable screen space (referred to as screen "real estate") which otherwise would be available for other functions and/or application programs. When multiple applications implement appbars within a desktop, the desktop may become somewhat cluttered and less user-friendly.

SUMMARY OF THE INVENTION

In view of the above discussion, it is an object of the present invention to provide access to an application's status and functions without consuming additional desktop real estate with an appbar.

This and other objects of the present invention are provided by systems, methods and computer program products for a user interface for a data processing system wherein a desktop workspace background has one or more sets of interactive graphical elements arranged in respective repeating patterns, and wherein each of the graphical elements of the one or more sets may be responsive to user input for performing various functions associated with one or more application programs. For example, a background may include first and second sets of graphical elements arranged in respective repeating patterns. Each of the graphical elements of the first set may be responsive to user input for performing a first function associated with a first application program. Each of the graphical elements of the second set may be responsive to user input for performing a second function associated with the first application program.

The graphical elements within either or both of the first and second sets may change appearances in response to changes in status of the first application program. In addition, the graphical elements within either or both of the first and second sets may be responsive to user input for performing multiple functions associated with the first application program, or with other application programs. The graphical elements within either or both of the first and second sets may be responsive to user input for displaying, within the workspace, information associated with one or more of the application programs. Preferably, information is displayed adjacent to a respective graphical element activated by a user.

According to other aspects of the present invention, a respective set of repeating graphical elements may be removed from a desktop workspace background when an application associated with the particular set of graphical elements is closed or otherwise removed from the desktop. In addition, the graphical elements of a particular set may be responsive to user input for performing multiple functions associated with one or more application programs. A user may choose which graphical elements to include within a background and may choose how to associate the graphical elements with various functions. A user may also assign priority to various sets of graphical elements for use with various applications. For example, a set of graphical elements having a priority greater than another set of graphical elements may have a greater number of graphical elements displayed. Conversely, a set of graphical elements having a priority lower than another set of graphical elements may have a lesser number of graphical elements displayed. A user may also have the ability to change characteristics of sets of graphical elements, such as the repeating pattern of a set.

By utilizing an interactive background according to the present invention, appbars associated with various application programs need not be placed in the desktop workspace. Accordingly, valuable screen real estate can be preserved. From a user's standpoint, the present invention is advantageous because various functions of an application program, as well as application status, can be accessed from virtually anywhere within the desktop workspace and without having to access various pull-down (or pull-up) menus. In addition, the interactive background is accessible even when many windows are open within a desktop, as long as part of the desktop is visible.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, or magnetic storage devices.

Figure 2:
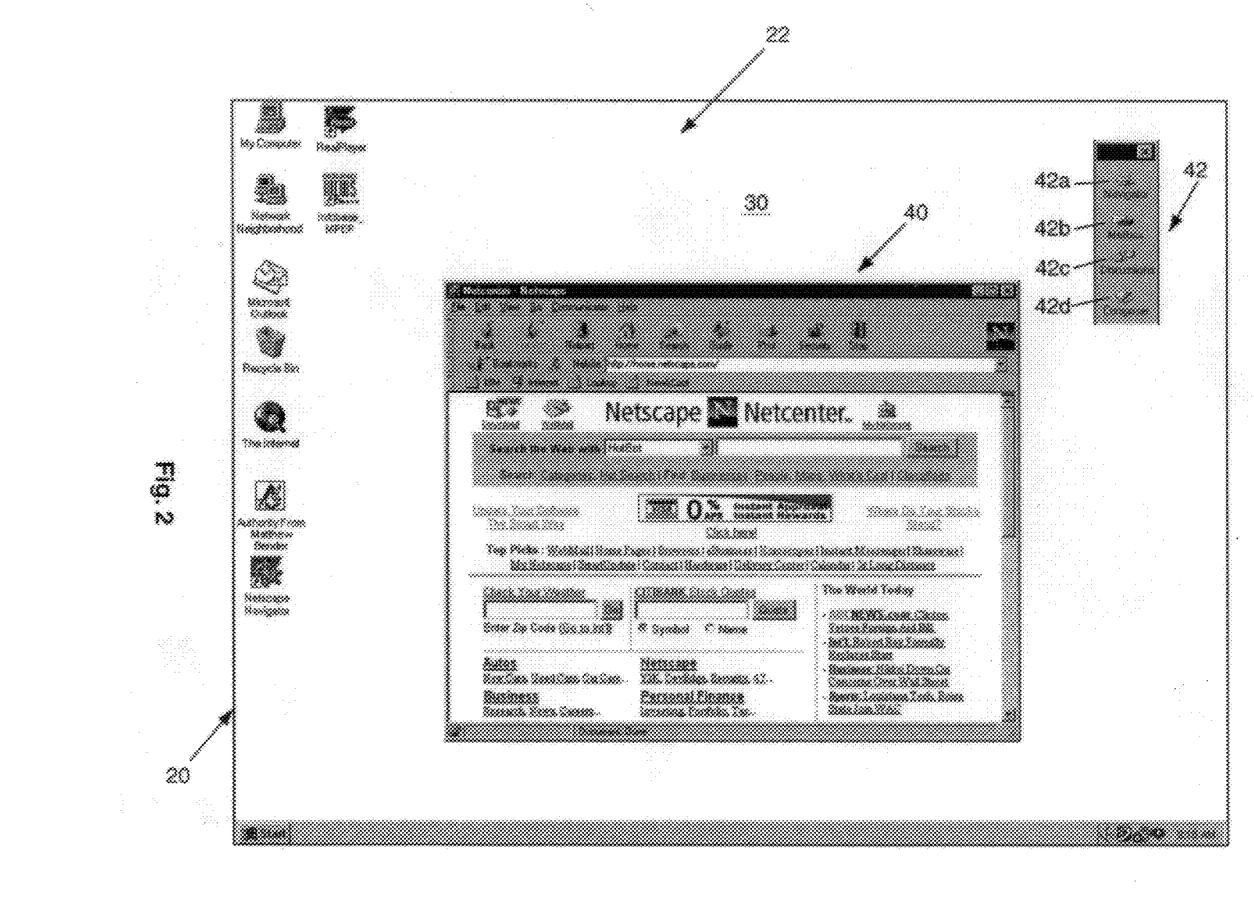
FIG. 2 illustrates an application program open within a window and an associated appbar within the desktop workspace of the graphical user interface of FIG. 1A.

Referring now to FIG. 2, an application is open within a window 40 located within the desktop workspace 22. In addition, an appbar 42, associated with the application within window 40, is located within the workspace 22. The appbar 42 provides additional functionality to the open application through various icons 42a, 42b, 42c, 42d. When activated, each of these icons 42a, 42b, 42c, 42d launch a respective application or perform a specified task or series of tasks, as would be known to those skilled in the art. The desktop workspace 22 in FIG. 2 has a blank background 30, for ease of illustration. However, it is to be understood that the background could have any one of a variety of designs.

Figure 3:
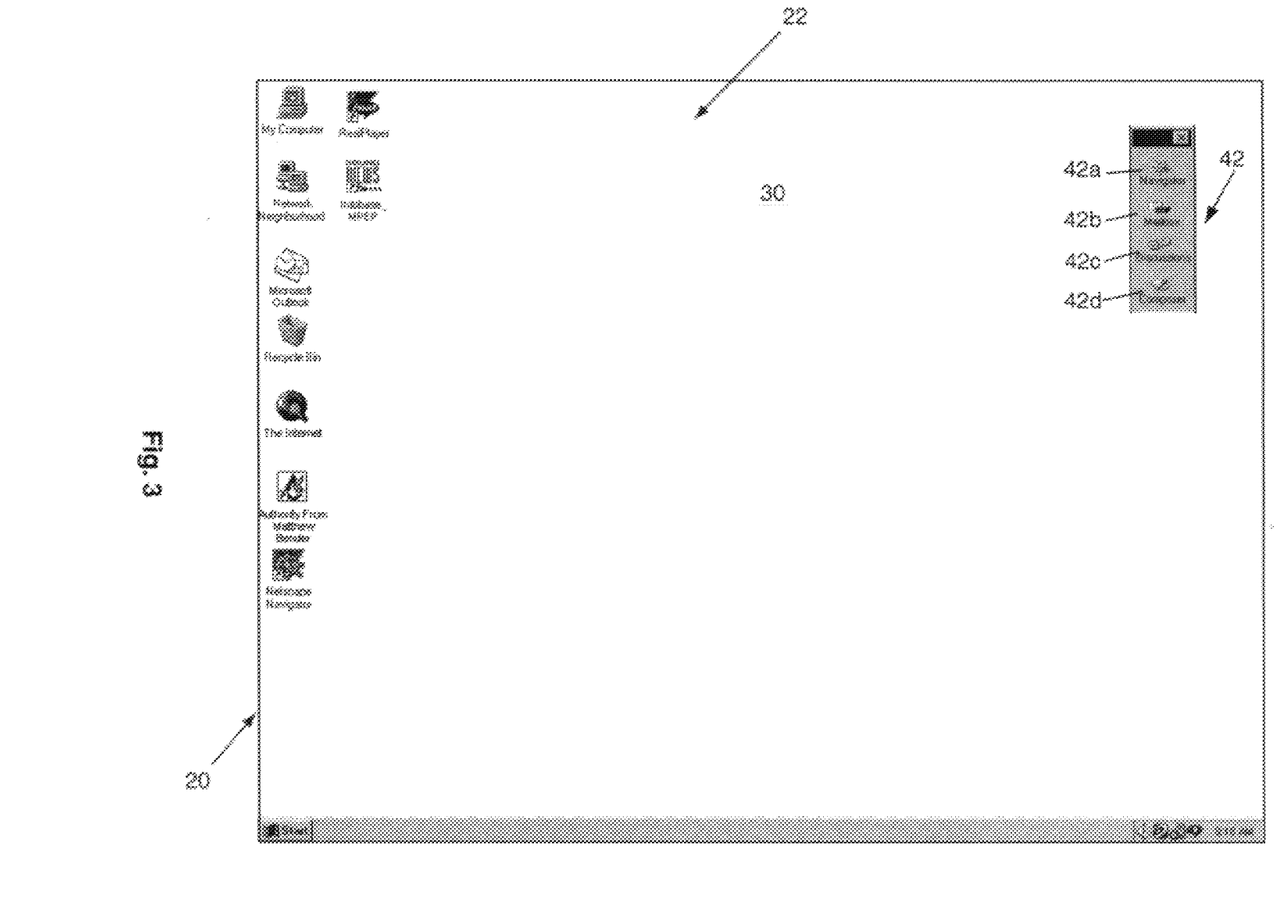
FIG. 3 illustrates the appbar of FIG. 2 with the window of the associated application program closed.

Typically, the appbar 42 is placed within the desktop workspace 22 when the application with which the appbar is associated with is open within a window within the workspace 22. Often, however, an appbar is the only visible part of a running application. A window of an application, if existing, may not be open when an associated appbar is open. The appbar 42 may be positioned anywhere in the workspace, or may be removed from the workspace, as is understood by those skilled in the art. Unless specifically removed from the workspace 22, appbars associated with application programs typically remain within the workspace to enable a user to quickly reopen the application, determine application status, and the like. FIG. 3 illustrates the appbar 42 of FIG. 2 remaining within the desktop workspace 22 after the application program window 40 has been closed. As is known to those skilled in the art, multiple appbars associated with respective application programs may coexist within the desktop at any given time.

Referring now to FIGS. 4–7, a portion of a desktop workspace 22 for the Windows 95® operating system is illustrated with a background 50 configured according to aspects of the present invention. The illustrated background 50 has two sets of interactive graphical elements 54, 56 arranged in respective repeating patterns. The repeating graphical elements 54 of the first set have a square geometrical shape. The repeating graphical elements 56 of the second set have a diamond geometrical shape. It is to be understood that the first and second sets of repeating graphical elements 54, 56 are not limited to the illustrated geometrical shapes. The first and second sets of repeating graphical elements 54, 56 preferably have different shapes so as to be easily distinguishable from each other.

Figure 4:
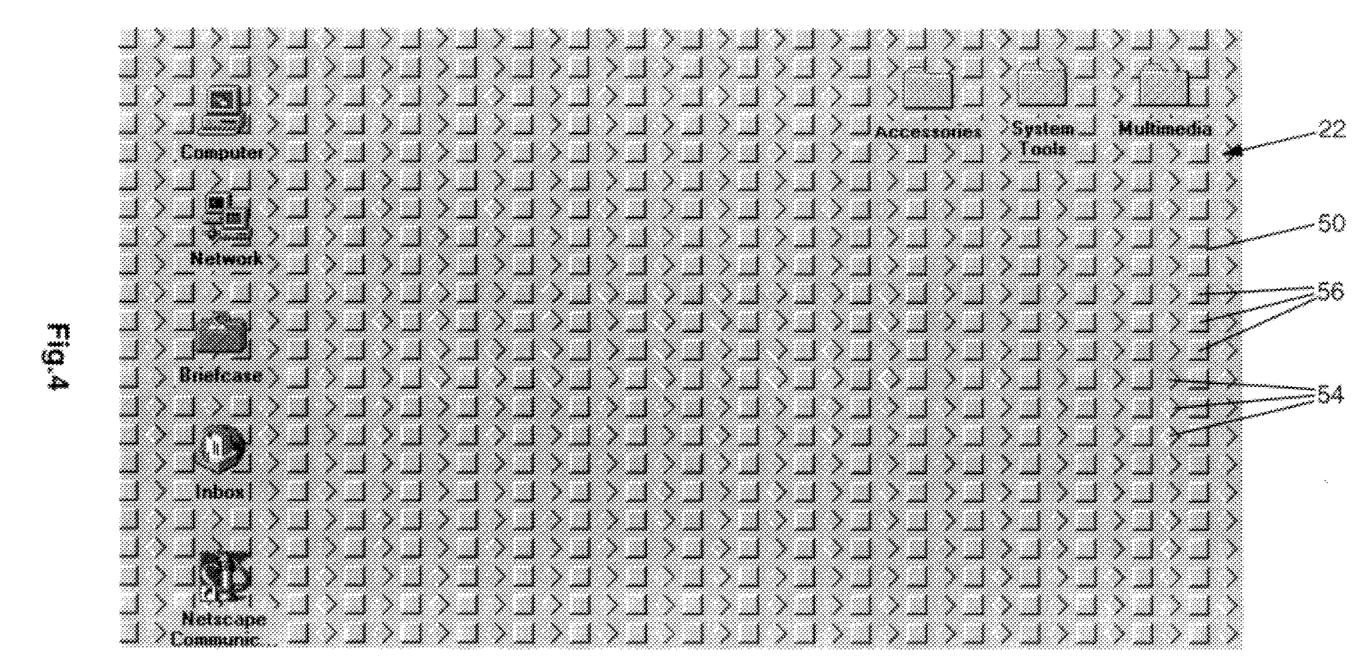
FIG. 4 illustrates a desktop workspace having a background with first and second sets of graphical elements arranged in respective repeating patterns.

The first and second sets of repeating graphical elements 54, 56 illustrated in FIG. 4 are arranged in columns. However, it is to be understood that the first and second sets of repeating graphical elements 54, 56 are not limited to the illustrated arrangement. The first and second sets of repeating graphical elements 54, 56 may be arranged in various configurations and patterns, without departing from the spirit and intent of the present invention. In addition, although two sets of repeating graphical elements are illustrated, any number of repeating graphical elements may be used according to the present invention.

The first and second sets of repeating graphical elements 54, 56 are associated with various functions of one or more application programs within the desktop. These functions may be accessed by activating one of the respective graphical elements 54, 56. As would be understood by those skilled in the art, a user may activate a graphical element by placing a cursor of a mouse on top of the graphical element and pressing a mouse button one or more times. The graphical elements 54, 56 may be utilized with application programs that are open within a window overlying the background 50, or that are inactive or otherwise not displayed within the desktop workspace 22.

A user may select one or more background designs having repeating graphical elements and may choose which application programs to associate the various repeating graphical elements with. In addition, it is preferable that a user be allowed to associate the various repeating graphical elements within a background with the various functions of an application program. For example, a user may choose to access a few frequently-used functions via one set of graphical elements and status-related information via another set of graphical elements. In the illustrated embodiment of FIGS. 4–7, the first and second sets of graphical elements 54, 56 are associated with an application not open within a window within the desktop workspace 22.

Figure 5:
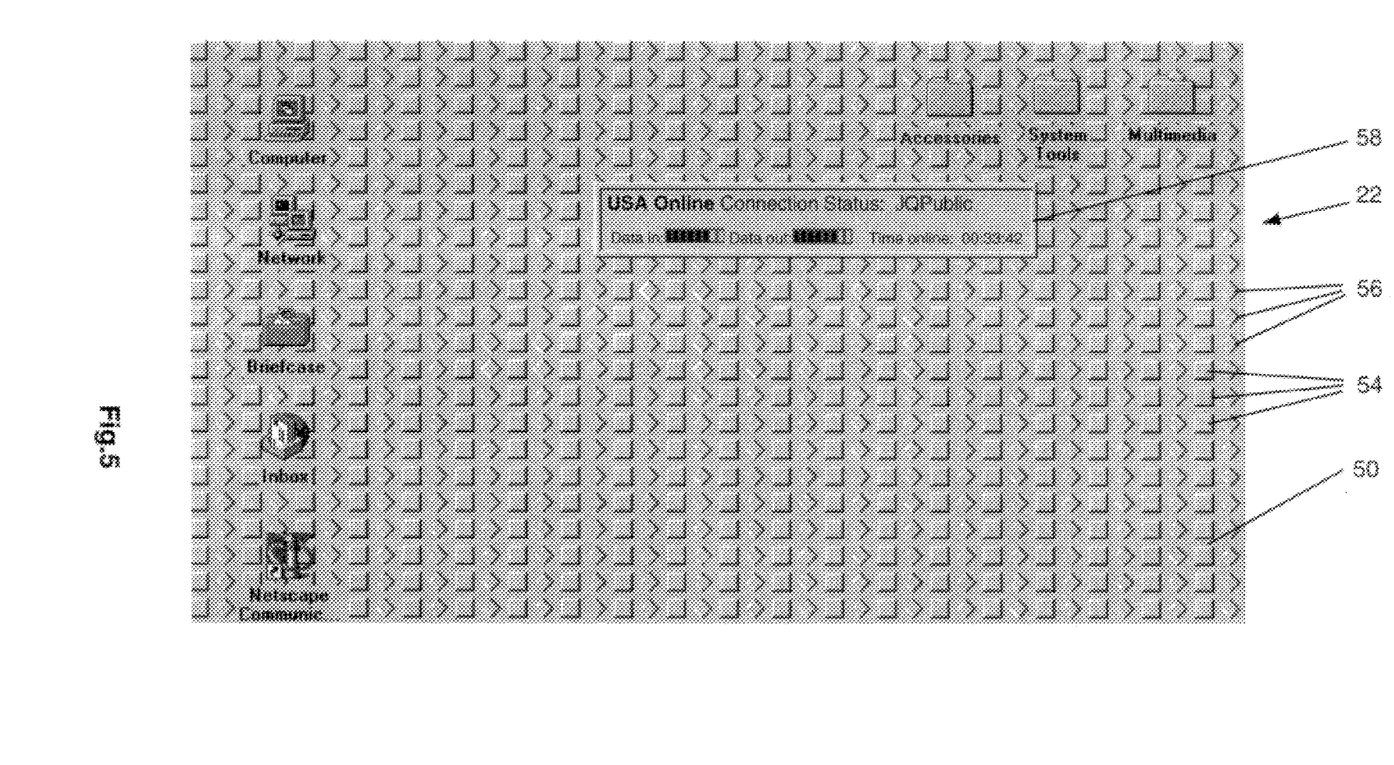
FIG. 5 illustrates the desktop workspace of FIG. 4 after one of the graphical elements in the second set has been activated by a user.

Referring to FIG. 5, a user has activated one of the graphical elements 56 of the second set (i.e., the diamond-shaped graphical elements), and a status box 58 has been displayed within the desktop workspace 22 as a result. The status box 58 may be displayed within the workspace 22 by activating any of the diamond-shaped graphical elements 56 within the background. Preferably, the status box 58 is displayed on top of any object displayed within the desktop workspace 22. In addition, the status box 58 is preferably displayed adjacent to the graphical element which was activated by a user. The status box 58 may be removed from the desktop workspace 22 via various methods, such as activating any of the diamond-shaped graphical elements 56, or the status box 58 may be displayed only when a graphical element is selected (e.g., when the mouse button is depressed).

Figure 6:
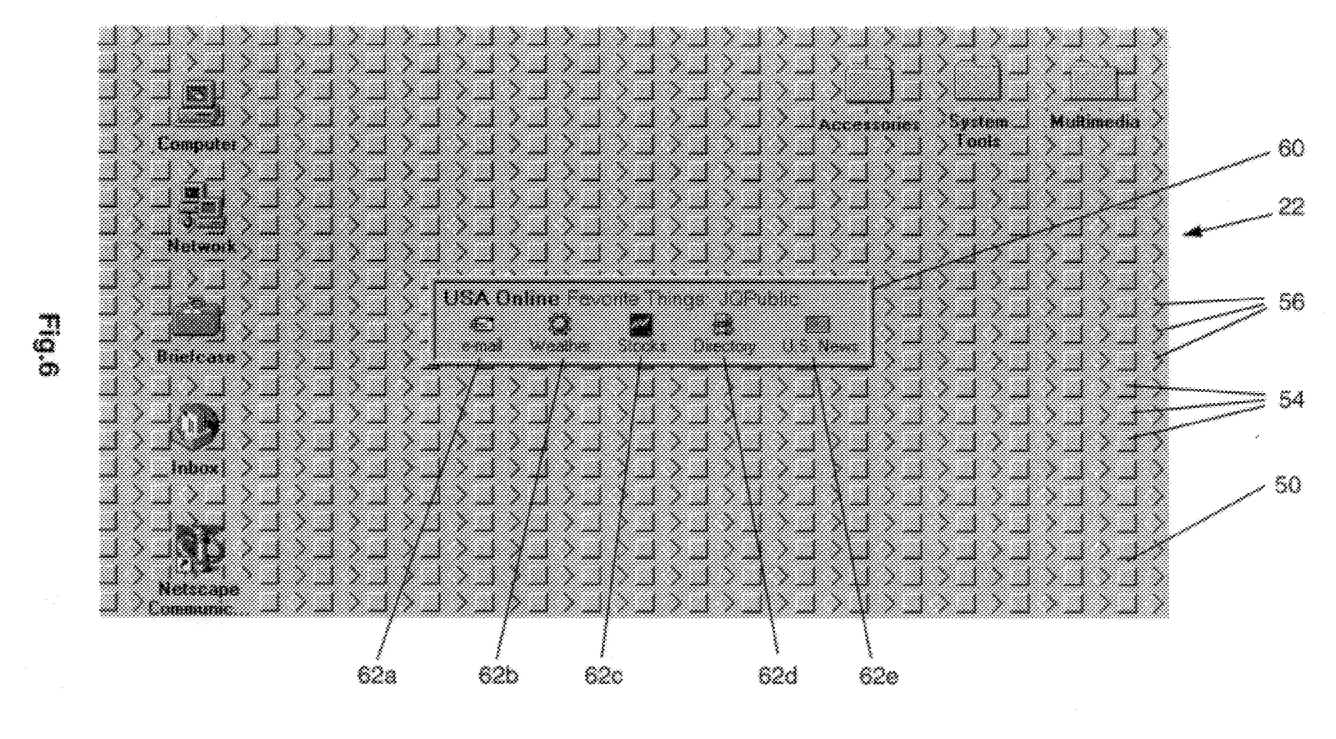
FIG. 6 illustrates the desktop workspace of FIG. 4 after one of the graphical elements in the first set has been activated by a user.

Referring to FIG. 6, a user has activated one of the graphical elements 54 of the first set (i.e., the square-shaped graphical elements), and a function box 60 has been displayed within the desktop workspace 22 as a result. The function box 60 may be displayed within the desktop workspace 22 by activating any of the square-shaped graphical elements 54. Preferably, the function box 60 is displayed on top of any object displayed within the desktop workspace 22. In addition, the function box 60 is preferably displayed adjacent to the graphical element which was activated by the user. The function box 60 may be removed from the desktop workspace via various methods, such as activating any of the square-shaped graphical elements 54. The illustrated function box 60 contains a plurality of icons 62a, 62b, 62c, 62d, 62e each of which is associated with a respective function of an application. By activating any of the icons 62a, 62b, 62c, 62d, 62e a user may start the application associated therewith, or start a respective function of the application.

Figure 7:
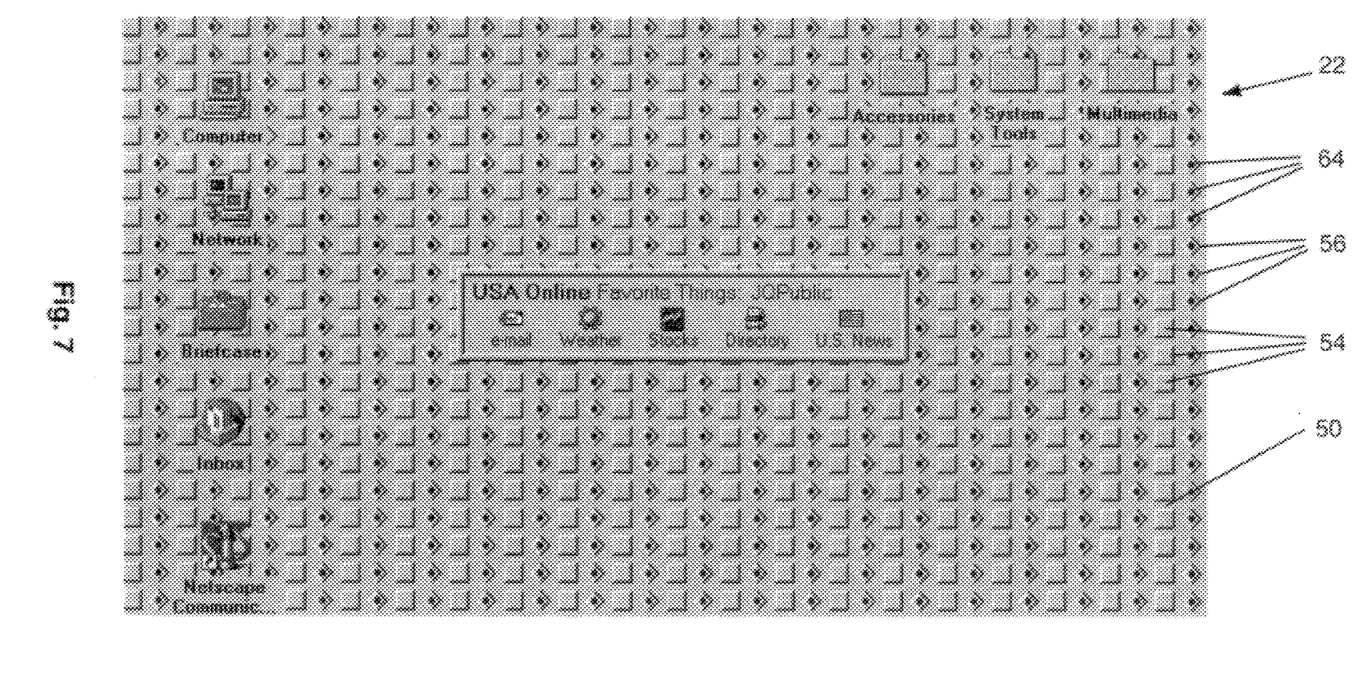
FIG. 7 illustrates the desktop workspace of FIG. 4 wherein the appearance of the second set of graphical elements has changed.

Referring to FIG. 7, another aspect of the present invention is illustrated, wherein graphical elements within a workspace background change appearance in response to changes in the application associated with which the graphical elements. In the illustrated embodiment, the second set of graphical elements 56 are configured to change their appearance. Indicia 64 in the shape of a "dot" is contained within the center of each of the diamond-shaped graphical elements 56. The indicia 64 can be used to signal a user that an informational message from the application program is waiting or that the status of the application program has changed. The user can receive whatever information is waiting by activating any one of the diamond-shaped graphical elements 56. The information may be presented to the user via a box displayed within the desktop workspace 22. The displayed information can be removed from the desktop workspace by activating the diamond-shaped graphical element 56 again.

Figure 8:
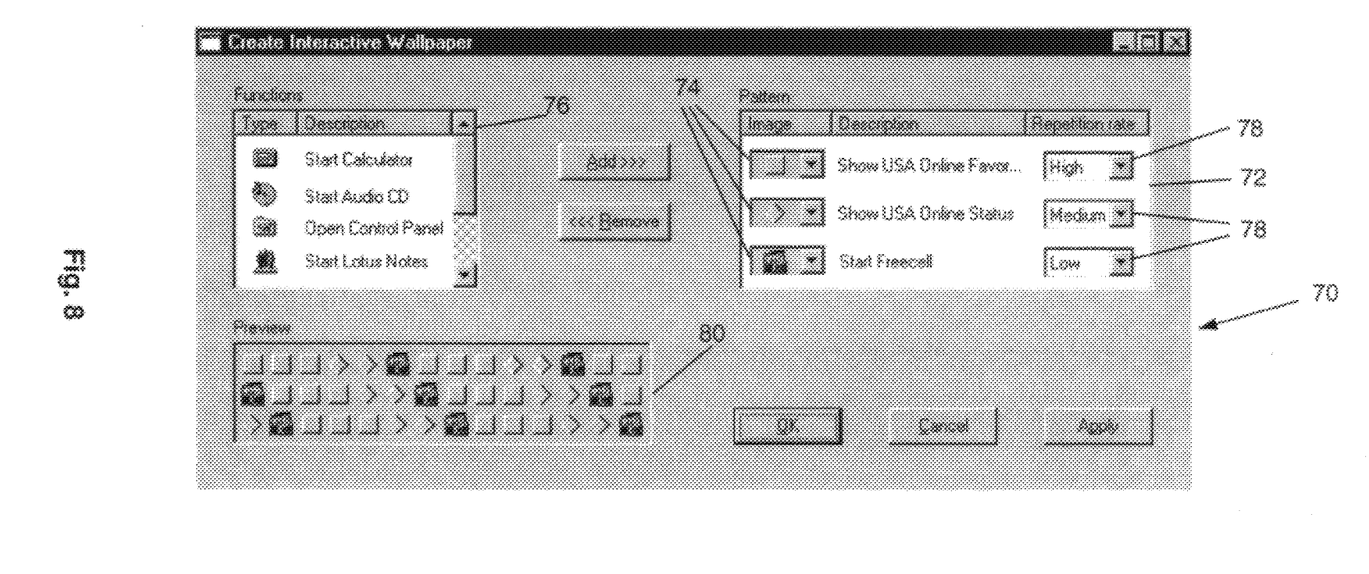
FIG. 8 illustrates an exemplary user interface for configuring graphical elements and their associated functions, according to the present invention.

Referring now to FIG. 8, an exemplary user interface 70 for configuring graphical elements and their associated functions, according to aspects of the present invention, is illustrated. Via controls provided in box 72, a user may select graphical elements to include in respective sets using menus 74, and may associate respective applications and functions to the selected graphical elements using box 76. Priority may be assigned to each set of graphical elements via controls 78. In the illustrated example, repetition of graphical elements within a set is proportional to priority of a set. A preview box 80 is also preferably provided for a user to preview what a background will look like with various sets of graphical elements displayed therein.

Figure 9:
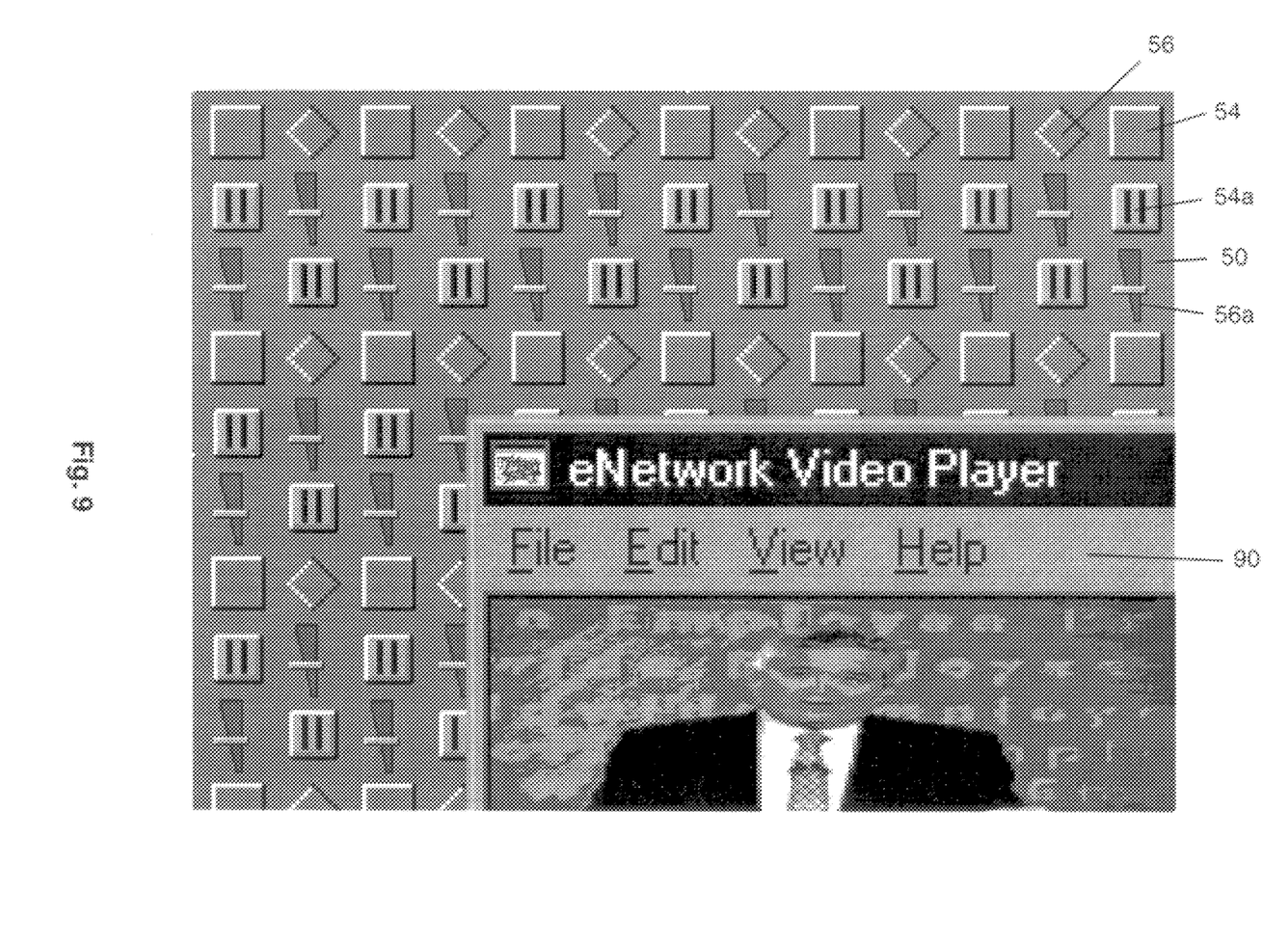
FIG. 9 illustrates the dynamic nature of graphical elements according to the present invention is illustrated.

Referring now to FIG. 9, an example of the dynamic nature of graphical elements within a background 50, according to the present invention, is illustrated. In the illustrated background 50, some of the graphical elements 54, 56 have changed to pause and volume controls 54a, 56a to facilitate the video application displayed in window 90. The graphical elements 54a, 56a may revert to graphical elements 54, 56 respectively after the video application has been removed from the desktop, or to other graphical elements depending on the application(s) running and/or user configuration. Various other dynamic functions can be performed using graphical elements within a displayed background, according to the present invention.

Figure 10:
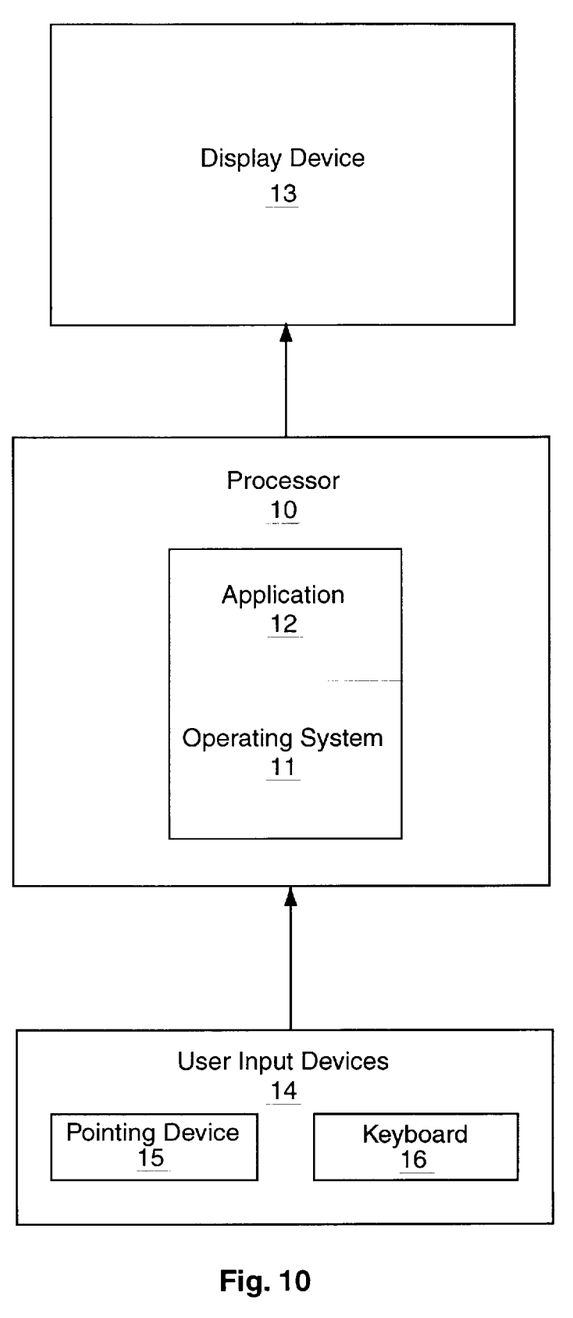
FIG. 10 illustrates an exemplary data processing system in which the present invention may be implemented.

Referring now to FIG. 10, an exemplary data processing system in which the present invention may be implemented is illustrated. As seen in FIG. 10, a data processor 10 may have an operating system 11 resident therein. An application program 12 typically executes via the operating system 11. The processor 10 displays information on a display device 13 which has a plurality of picture elements (collectively referred to as a screen). The information is displayed on the display device 13 within a graphical user interface as described above. The contents of the screen of the display device 13 and, therefore, the appearance of the graphical user interface, may be controlled or altered by an application program 12 or the operating system 11 either individually or in combination. For obtaining input from a user, the operating system 11, the application program 12, and the repeating graphical elements of the workspace background, may utilize user input devices 14. User input devices 14 may include a pointing device 15, such as a mouse, and a keyboard 16 or other input devices known to those of skill in the art. User input devices 14 may be used to designate areas of the screen or locations on the screen such as the border of a workspace or the corner of the borders of the workspace.

Figure 11:
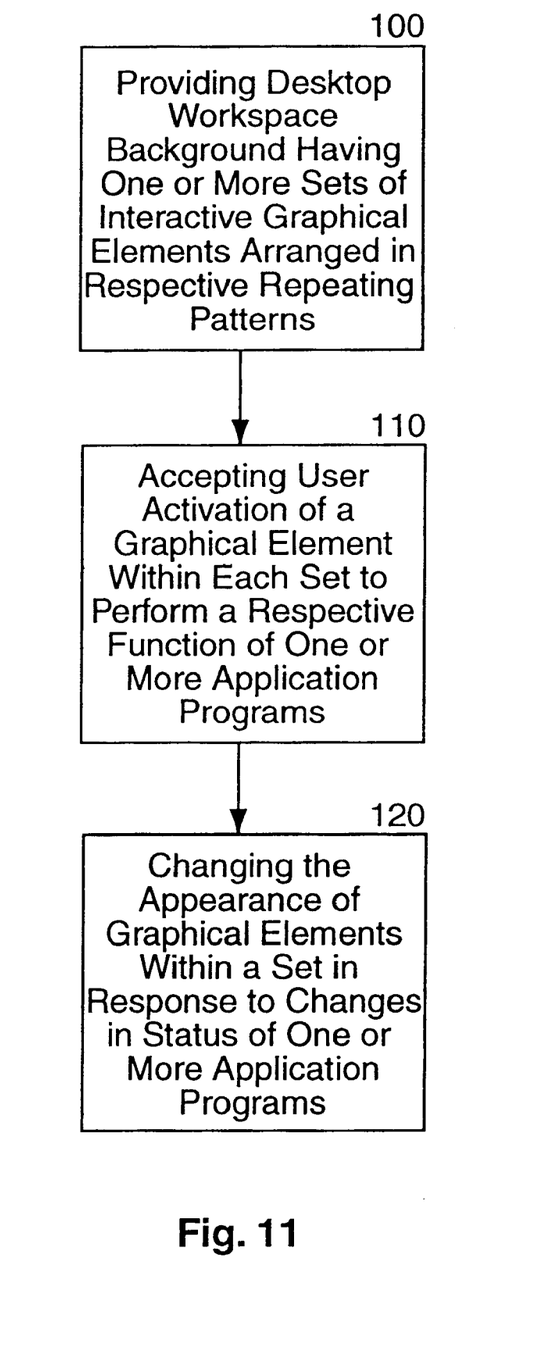
FIG. 11 schematically illustrates operations for providing a graphical user interface for a data processing system, according to aspects of the present invention.

Referring now to FIG. 11, operations for providing a graphical user interface for a data processing system, according to the present invention, include: providing a desktop workspace background having one or more sets of interactive graphical elements arranged in respective repeating patterns (Block 100); accepting user activation of a graphical element within each set to perform a respective function of one or more application programs (Block 110); and changing the appearance of graphical elements within a set in response to changes in status of one or more application programs (Block 120). As described above, a single application program may have first and second sets (or more) of graphical elements arranged in a repeating pattern associated therewith. Each of the graphical elements in the first set may perform a first function associated with the application program. Each of the graphical elements in the second set may perform a second function associated with the application program. Additional sets of graphical elements having a repeating pattern may be added as desired and may be associated with one or more application programs. The appearance of the graphical elements within each respective set may change in response to changes in status of the application programs.

It will be understood that each block of the flowchart illustrations of FIG. 11 and combinations of blocks in the flowchart illustrations of FIG. 11, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A user interface for a data processing system, the user interface comprising:
    a desktop having a workspace with a background;
    wherein the background comprises a first set of graphical elements arranged in a repeating pattern, each of the graphical elements of the first set responsive to user input for performing a first function associated with a first application program; and
    means for displaying information adjacent a respective graphical element of the first set of graphical elements activated by a user.

2. A user interface according to claim 1 wherein the background further comprises a second set of graphical elements arranged in a repeating pattern, each of the graphical elements of the second set responsive to user input for performing a second function associated with the first application program.

3. A user interface according to claim 2 wherein the background further comprises a third set of graphical elements arranged in a repeating pattern, each of the graphical elements of the third set responsive to user input for performing a function associated with a second application program.

4. A user interface according to claim 1 further comprising means for changing an appearance of the graphical elements of the first set in response to changes in status of the first application program.

5. A user interface according to claim 1 wherein at least one of the graphical elements of the first set is responsive to user input for performing a plurality of functions associated with the first application program.

6. A user interface according to claim 1 wherein each of the graphical elements of the first set is responsive to user input for displaying within the workspace information associated with the first application program.

7. A user interface according to claim 1 wherein at least one of the graphical elements of the first set is responsive to user input for performing a second function associated with the first application program.

8. A user interface according to claim 1 wherein appearance of the graphical elements of the first set are user configurable.

9. A user interface for a data processing system, the user interface comprising:
    a desktop having a workspace with a background;
    a first window overlying the background within the workspace, the first window having a first application program associated therewith;
    wherein the background comprises a first set of graphical elements arranged in a repeating pattern, each of the graphical elements of the first set responsive to user input for performing a first function associated with the first application program; and
    means for dynamically changing appearance and functionality of the graphical elements of the first set in response to changes in status of the first application program, such that when the graphical elements have a first appearance, the graphical elements are responsive to user input for performing a first function associated with the first application program and such that when the graphical elements have a second appearance, the graphical elements are responsive to user input for performing a second function associated with the first application program.

10. A user interface according to claim 9 wherein the background comprises a second set of graphical elements arranged in a repeating pattern, each of the graphical elements of the second set responsive to user input for performing a second function associated with the first application program.

11. A user interface according to claim 9 further comprising a second window overlying the background within the workspace, the second window having a second application program associated therewith, and wherein the background comprises a third set of graphical elements arranged in a repeating pattern, each of the graphical elements of the third set responsive to user input for performing a function associated with the second application program.

12. A user interface according to claim 11 comprising means for removing the third set of graphical elements from the background when the second window is closed.

13. A user interface according to claim 11 further comprising means for associating the graphical elements of the first set with a function associated with the second application program.

14. A user interface according to claim 9 wherein at least one of the graphical elements of the first set is responsive to user input for performing a plurality of functions associated with the first application program.

15. A user interface according to claim 9 wherein at least one of the graphical elements of the first set is responsive to user input for performing a second function associated with the first application program.

16. A user interface according to claim 9 wherein each of the graphical elements of the first set is responsive to user input for displaying within the workspace information associated with the first application program.

17. A method of providing a graphical user interface for a data processing system, the method comprising the steps of:
   providing a desktop workspace background comprising a first set of graphical elements arranged in a repeating pattern, each of the graphical elements of the first set responsive to user input for performing a first function associated with a first application program;
   accepting user activation of any one of the graphical elements of the first set to perform a first function associated with the first application program;
   dynamically changing appearance and functionality of the graphical elements of the first set in response to changes in status of the first application program; and
   accepting user activation of any one of the graphical elements of the first set having a changed appearance to perform a second function associated with the first application program.

18. A method according to claim 17 wherein the step of providing a desktop workspace background comprises providing a second set of graphical elements arranged in a repeating pattern, each of the graphical elements of the second set responsive to user input for performing a second function associated with the first application program.

19. A method according to claim 18 further comprising the step of accepting user activation of any one of the graphical elements of the second set to perform the second function.

20. A method according to claim 17 wherein the step of providing a desktop workspace background comprises providing a third set of graphical elements arranged in a repeating pattern, each of the graphical elements of the third set responsive to user input for performing a function associated with a second application program.

21. A method according to claim 20 further comprising the step of accepting user activation of any one of the graphical elements of the third set to perform a function associated with the second application program.

22. A computer program product for providing a graphical user interface for a data processing system, the computer program product comprising a computer usable storage medium having computer readable program code means embodied in the medium, the computer readable program code means comprising:
   computer readable program code means for providing a desktop workspace background comprising a first set of graphical elements arranged in a repeating pattern, each of the graphical elements of the first set responsive to user input for performing a first function associated with a first application program;
   computer readable program code means for accepting user activation of any one of the graphical elements of the first set to perform a first function associated with the first application program; and
   computer readable program code means embodied in the medium for dynamically changing appearance and functionality of the graphical elements of the first or second sets in response to changes in status of the first application program, such that when the graphical elements have a first appearance, the graphical elements are responsive to user input for performing a first function associated with the first application program and such that when the graphical elements have a second appearance, the graphical elements are responsive to user input for performing a second function associated with the first application program.

23. A computer program product according to claim 22 further comprising computer readable program code means embodied in the medium for providing a second set of graphical elements arranged in a repeating pattern, each of the graphical elements of the second set responsive to user input for performing a second function associated with the first application program.

24. A computer program product according to claim 23 further comprising computer readable program code means embodied in the medium for accepting user activation of any one of the graphical elements of the second set to perform a second function associated with the first application program.

25. A computer program product according to claim 22 further comprising computer readable program code means embodied in the medium for providing a third set of graphical elements arranged in a repeating pattern, each of the graphical elements of the third set responsive to user input for performing a function associated with a second application program.

26. A computer program product according to claim 25 further comprising computer readable program code means embodied in the medium for accepting user activation of any one of the graphical elements of the third set to perform a function associated with the second application program.

27. A system for providing a data processing system graphical user interface, comprising:
   a display;
   means for providing on the display a desktop workspace background comprising a first set of graphical elements arranged in a repeating pattern, each of the graphical elements of the first set responsive to user input for performing a first function associated with a first application program;
   means for accepting user activation of any one of the graphical elements of the first set to perform a first function associated with the first application program; and
   means for dynamically changing appearance and functionality of the graphical elements of the first set in response to changes in status of the first application program, such that when the graphical elements have a first appearance, the graphical elements are responsive to user input for performing a first function associated with the first application program and such that when the graphical elements have a second appearance, the graphical elements are responsive to user input for performing a second function associated with the first application program.

28. A system according to claim 27 wherein said means for providing a desktop workspace background comprises means for providing a second set of graphical elements arranged in a repeating pattern, each of the graphical elements of the second set responsive to user input for performing a second function associated with the first application program.

29. A system according to claim 28 further comprising means for accepting user activation of any one of the graphical elements of the second set to perform the second function.

30. A system according to claim 27 wherein said means for providing a desktop workspace background comprises means for providing a third set of graphical elements arranged in a repeating pattern, each of the graphical elements of the third set responsive to user input for performing a function associated with a second application program.

31. A system according to claim 30 further comprising means for accepting user activation of any one of the graphical elements of the third set to perform a function associated with the second application program.

32. A system according to claim 27 further comprising means for changing an appearance of the graphical elements of the first set in response to a change in status of the first application program.

33. A system according to claim 27 further comprising means for configuring appearance of the graphical elements of the first set.

34. A user interface for a data processing system, the user interface comprising:
    a desktop having a workspace with a background; and
    a first set of graphical elements arranged in a first repeating pattern within the background, wherein each of the graphical elements of the first set is responsive to user input for performing a first function associated with a first application program; and
    a second set of graphical elements arranged in a second repeating pattern within the background, wherein each of the graphical elements of the second set is responsive to user input for performing a second function associated with the first application program, wherein the second function has a lower priority relative to a priority of the first function, and wherein the number of graphical elements in the second repeating pattern is less than the number of graphical elements in the first repeating pattern.

35. A user interface according to claim 34 wherein the background further comprises a third set of graphical elements arranged in a repeating pattern, each of the graphical elements of the third set responsive to user input for performing a function associated with a second application program.

36. A user interface according to claim 34 further comprising means for changing an appearance of the graphical elements of the first set in response to changes in status of the first application program.

37. A user interface according to claim 34 wherein at least one of the graphical elements of the first set is responsive to user input for performing a plurality of functions associated with the first application program.

38. A user interface according to claim 34 wherein each of the graphical elements of the first set is responsive to user input for displaying within the workspace information associated with the first application program.

39. A user interface according to claim 34 further comprising means for displaying information adjacent a respective graphical element of the first set of graphical elements activated by a user.

40. A user interface according to claim 34 wherein at least one of the graphical elements of the first set is responsive to user input for performing a second function associated with the first application program.

41. A user interface according to claim 34 wherein appearance of the graphical elements of the first set are user configurable.

42. A method of providing a graphical user interface for a data processing system, the method comprising the steps of:
    providing a desktop workspace background comprising a first set of graphical elements arranged in a repeating pattern, each of the graphical elements of the first set responsive to user input for performing a first function associated with a first application program;
    accepting user activation of any one of the graphical elements of the first set to perform a first function associated with the first application program; and
    displaying information adjacent a respective graphical element of the first set of graphical elements activated by a user.

43. A method according to claim 42 wherein the step of providing a desktop workspace background comprises providing a second set of graphical elements arranged in a repeating pattern, each of the graphical elements of the second set responsive to user input for performing a second function associated with the first application program.

44. A method according to claim 43 further comprising the step of accepting user activation of any one of the graphical elements of the second set to perform the second function.

45. A method according to claim 42 wherein the step of providing a desktop workspace background comprises providing a third set of graphical elements arranged in a repeating pattern, each of the graphical elements of the third set responsive to user input for performing a function associated with a second application program.

46. A method according to claim 45 further comprising the step of accepting user activation of any one of the graphical elements of the third set to perform a function associated with the second application program.

47. A method according to claim 42 further comprising the step of changing an appearance of the graphical elements of the first set in response to a change in status of the first application program.

48. A computer program product for providing a graphical user interface for a data processing system, the computer program product comprising a computer usable storage medium having computer readable program code means embodied in the medium, the computer readable program code means comprising:
    computer readable program code means for providing a desktop workspace background comprising a first set of graphical elements arranged in a repeating pattern, each of the graphical elements of the first set responsive to user input for performing a first function associated with a first application program;
    computer readable program code means for accepting user activation of any one of the graphical elements of the first set to perform a first function associated with the first application program; and
    computer readable program code means for displaying information adjacent a respective graphical element of the first set of graphical elements activated by a user.

49. A computer program product according to claim 48 further comprising computer readable program code means embodied in the medium for providing a second set of graphical elements arranged in a repeating pattern, each of the graphical elements of the second set responsive to user input for performing a second function associated with the first application program.

50. A computer program product according to claim 49 further comprising computer readable program code means embodied in the medium for accepting user activation of any one of the graphical elements of the second set to perform a second function associated with the first application program.

51. A computer program product according to claim 48 further comprising computer readable program code means embodied in the medium for providing a third set of graphical elements arranged in a repeating pattern, each of the graphical elements of the third set responsive to user input for performing a function associated with a second application program.

52. A computer program product according to claim 51 further comprising computer readable program code means embodied in the medium for accepting user activation of any one of the graphical elements of the third set to perform a function associated with the second application program.

53. A computer program product according to claim 48 further comprising computer readable program code means embodied in the medium for changing an appearance of the graphical elements of the first or second sets in response to a change in status of the first application program.

* * * * *